(No Model.)

J. J. JOHNSON.
COTTON CHOPPER.

No. 245,175. Patented Aug. 2, 1881.

WITNESSES:

INVENTOR:
J. J. Johnson
BY
ATTORNEYS.

UNITED STATES PATENT OFFICE.

JAY J. JOHNSON, OF ABERDEEN, MISSISSIPPI.

COTTON-CHOPPER.

SPECIFICATION forming part of Letters Patent No. 245,175, dated August 2, 1881.

Application filed April 28, 1881. (No model.)

*To all whom it may concern:*

Be it known that I, JAY J. JOHNSON, of Aberdeen, in the county of Monroe and State of Mississippi, have invented a new and useful Improvement in Cotton Choppers and Cultivators, of which the following is a specification.

Figure 1:
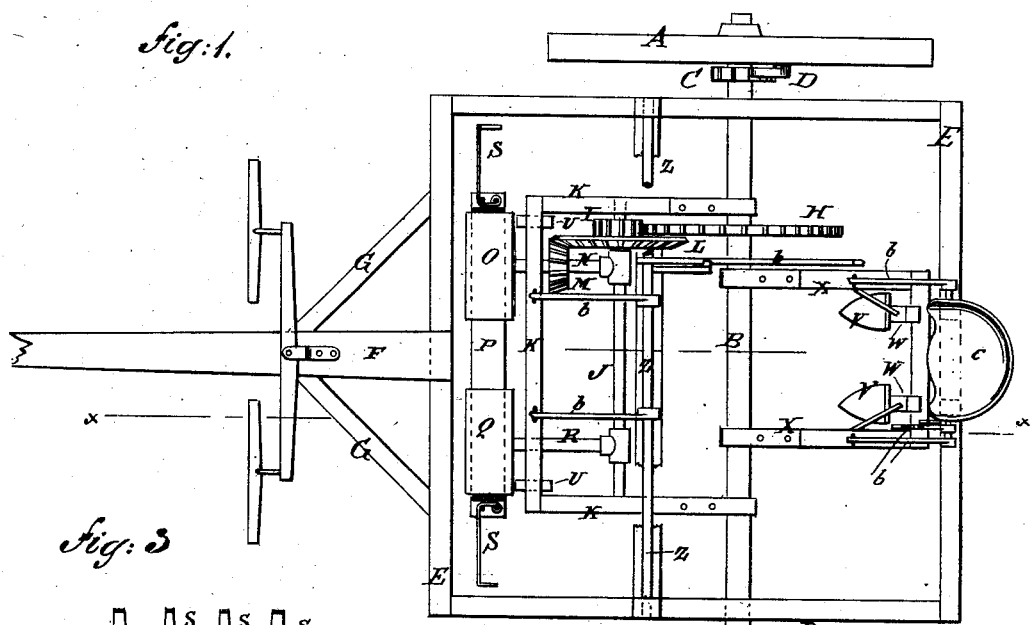
Figure 3:
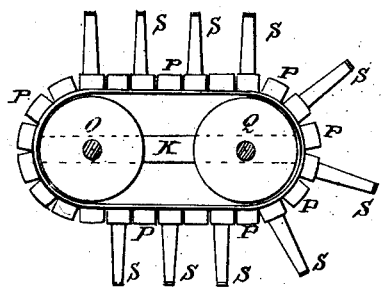
Figure 2:
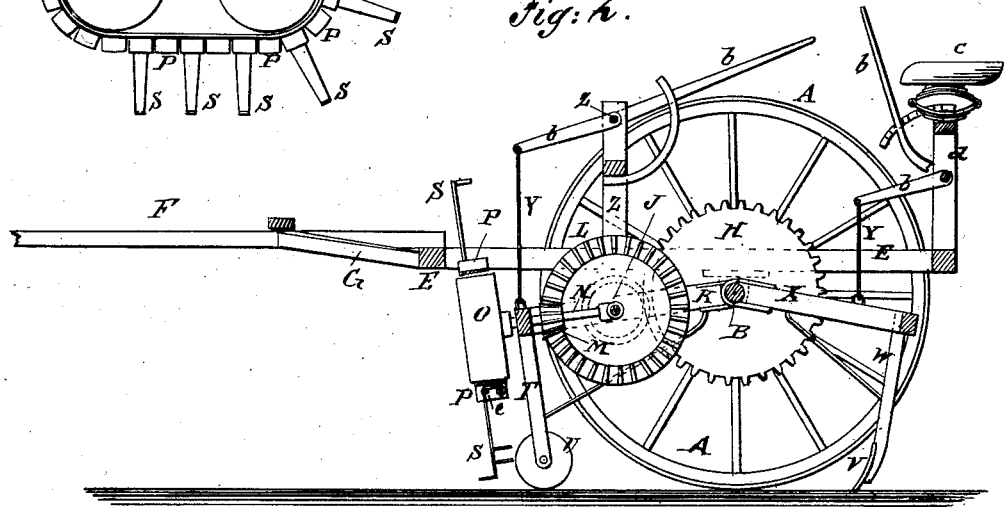

Figure 1 is a plan view of my improvement. Fig. 2 is a sectional side elevation of the same, taken through the line $x\,x$, Fig. 1. Fig. 3 is a front elevation of the chopping-knives, belt, and pulleys.

Similar letters of reference indicate corresponding parts.

The object of this invention is to facilitate the chopping of cotton and other drilled plants to a stand.

The invention consists in constructing a cotton chopper and cultivator of a carriage, a hinged frame, a driving-gearing, a pair of pulleys carrying a belt provided with chopping-knives, the gage-wheels, and a hinged frame carrying the dirting-plows and their standards, as will be hereinafter fully described.

A represents the wheels, which are connected with the axle B by the ratchet-wheels C and pawls D. The axle B revolves in bearings attached to the side bars of the frame E.

To the front cross-bar of the frame E is rigidly attached the tongue F, which is strengthened against lateral strain by the hounds G.

To the axle B is attached a large gear-wheel, H, the teeth of which mesh into the teeth of a small gear-wheel, I, journaled to the end of the shaft J. The shaft J is attached to the side bars, K, the forward ends of which are connected by a cross-bar, and their rear ends are hinged to the axle B by straps or other suitable connections that will not interfere with the revolution of the said axle.

To the gear-wheel I is rigidly attached a large beveled-gear wheel, L, the teeth of which mesh into the teeth of the small beveled-gear wheel M attached to the shaft N.

To the forward end of the shaft N is attached a large pulley, O, around which passes a metal belt, P, formed of plates or sections hinged to each other. The metal belt P also passes around a pulley, Q, similar to the pulley O, and attached to the forward end of the shaft R. The shafts N R are parallel, revolve in bearings in the cross-bar of the hinged frame K, and their rear ends revolve in bearings attached to the shaft J.

To the sections of the metal belt P are hinged the shanks of the knives S, which are held in place by wooden pins $e$, so that should the knives strike an obstruction the said wooden pins will break and allow the said knives to swing back to prevent the knives from being broken.

A part of the belt P is without knives, as shown in Fig. 3, to leave plants for a hill, so that at each revolution of the said belt a hill will be left and the plants between two hills will be cut away. The first knife of the series is bent forward, and all the other knives are bent rearward to prevent the plants left for a hill from being injured.

To the hinged frame K are attached standards T, having wheels U pivoted to their lower ends, to roll upon the ground upon the opposite sides of the row of plants, to prevent the frame K from dropping down too low. The standards T are adjustably attached to the frame K, so that the frame K can be raised or lowered to cause the knives to work shallower or deeper in the ground, as may be required. The plants, after being chopped to a stand, are hilled or dirted by the plows V, the standards W of which are attached to the cross-bar of the frame X, the forward ends of the side bars of which are hinged to the axle B.

To the hinged frames K X are attached the ends of cords or chains Y, which are attached to levers $b$ pivoted to supports Z $d$, attached to the frame E in such positions that the levers $b$ can be reached and operated by the driver from his seat $c$. The support $d$ of the seat $c$ is attached to the rear part of the frame E in such a position that the weight of the driver will balance the machine.

Having thus fully described my invention, I claim as new and desire to secure by Letters Patent—

1. In a cotton chopper and cultivator, the combination, with the axle B, provided with the gear-wheel H, of the hinged frame K, the shaft J, provided with gear-wheels I L, the shaft N, provided with the gear-wheel M and pulley O, the shaft R, provided with the pulley Q, and the endless belt P, substantially as and for the purpose set forth.

2. In a cotton chopper and cultivator, the combination, with the hinged frame K and the driving-gearing, of the pulleys O Q, the belt P, and the knives S, substantially as herein shown and described, whereby the plants will be chopped to a stand with a cut of uniform depth all the way across the row, as set forth.

3. In a cotton chopper and cultivator, the endless belt P, provided with a series of knives, the first of which is bent forward, while the others are bent rearward, substantially as and for the purpose set forth.

4. In a cotton chopper and cultivator, the endless belt P, carrying a series of chopping-knives, and having a portion of its surface without knives, substantially as and for the purpose set forth.

5. In a cotton chopper and cultivator, the combination, with the endless belt P, of the knives hinged thereto and held in place by the pins c, substantially as and for the purpose set forth.

6. In a cotton chopper and cultivator, the combination, with the hinged frame K, carrying the endless belt of knives and its operating mechanism, of the standards T, provided with the wheels U, substantially as and for the purpose set forth.

JAY JOEL JOHNSON.

Witnesses:
ALFRED N. TAGERT,
CHAS. S. CUTTING.